Nov. 14, 1933.   L. D. WOODRUFF   1,934,960
TRAIN PIPE CONNECTER AND METALLIC HOSE THEREFOR
Original Filed Dec. 6, 1927   2 Sheets-Sheet 1
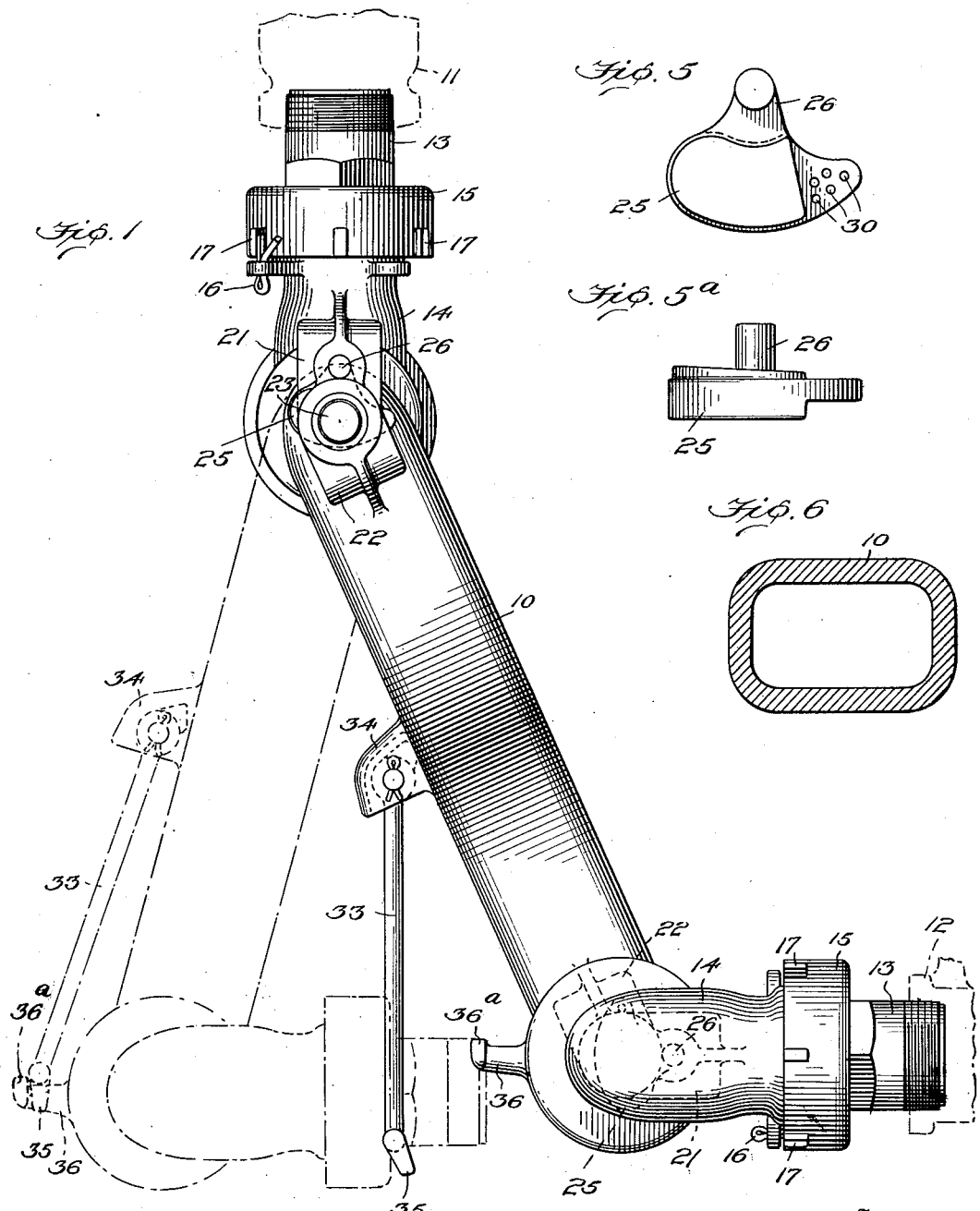

Nov. 14, 1933.  L. D. WOODRUFF  1,934,960
TRAIN PIPE CONNECTER AND METALLIC HOSE THEREFOR
Original Filed Dec. 6, 1927   2 Sheets-Sheet 2
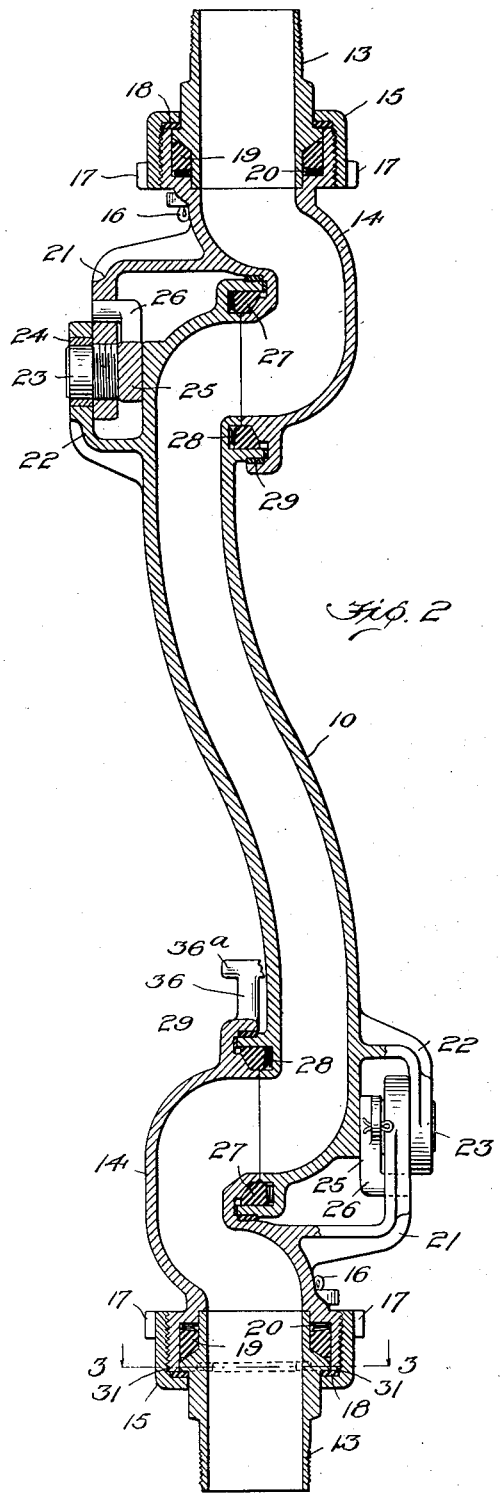
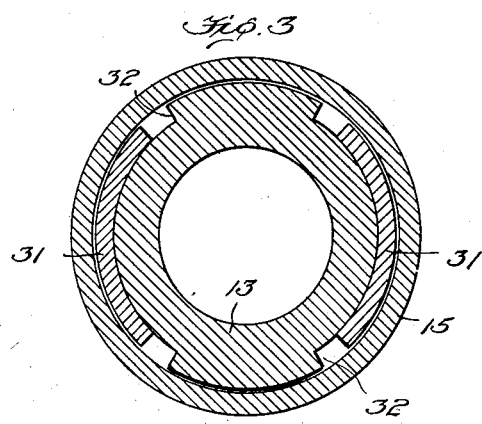
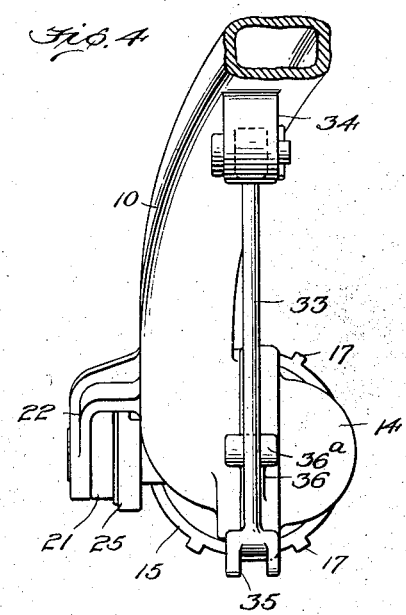
Inventor
L. D. Woodruff
By Church & Church
his Attorneys Patented Nov. 14, 1933

1,934,960

UNITED STATES PATENT OFFICE 1,934,960

TRAIN PIPE CONNECTER AND METALLIC HOSE THEREFOR

Leonidas D. Woodruff, Chicago, Ill., assignor to Harris Trust & Savings Bank, trustee, Chicago, Ill., a corporation of Illinois Application December 6, 1927, Serial No. 238,141
Renewed October 20, 1932

33 Claims. (Cl. 285—9)

This invention relates to train pipe connecters of the type comprising articulated metal hose sections, and to flexible metallic hose or piping for use in such connecters or for other purposes to which devices embodying my improvements may be applicable.

For connecting the steam pipe lines of adjacent railway cars, swing jointed metal connecters are believed to be more advantageous than other types of connecters, such as universal ball joint devices, because in the swing jointed type the connecter is so attached to the end of passenger cars that the locomotive step board may push the metal hose under the car without danger of breaking or damaging the same. This is not true of ball joint hose, wherein the movements are quite limited. Again, in the swing jointed metal connecter, there is rotary wear on the gaskets, making the latter wear more or less indefinitely, whereas in a universal movement of the ball joint type, the gaskets are worn by friction created on their surfaces by movements in a multiplicity of directions. In view of this, the present invention seeks to provide a swing jointed connecter of improved character and construction, and to provide improved metallic hose therefor. Preferably, as in the embodiment of my invention shown in the drawings, my hose structure is designed to reduce or minimize abrupt turns in the metal hose, permitting the steam to be passed quickly through a long train to the rear cars. This is accomplished in part by having the intermediate swinging member of the metal hose composed of an S-shaped casting with the weight of the connecter substantially uniformly distributed at the sides of the longitudinal center of the connecter.

A further object of the invention is to provide a novel arrangement for upholding the lower end of the connecter when unsupported by coupling attachment with the connecter of an adjacent car, so that there will be little, if any, likelihood of the lower end or the coupler head carried thereby being damaged by dragging along or impacting against the roadbed. The means herein shown for this purpose consists of a pivotally mounted latch actuated automatically or by gravity to engage a catch carried by the lower end of the connecter, whereby, when the connecter is uncoupled and its said lower end being held horizontally is swung toward the car on which it is carried, the latch and catch will automatically engage one another and prevent the lower end dropping to a point where it may possibly hit the ties or other obstacles protruding from the roadbed.

In my improved connecter, in the specific form shown in the drawings, there is an intermediate S-shaped metallic hose member having connected to its ends coupling elements by means of which it is connected to the end valve of the car and to the coupler head. Said intermediate member is adapted to swing with respect to the coupling elements at either of its ends, and another object of the invention is the novel manner in which said intermediate member is pivotally connected to the coupling members to permit such swinging movement. In other words I provide improved means whereby the swing-jointed elements of the hose structure are detachably connected in their swing-jointed relationship. This pivotal connection is such that the parts can be disconnected without the use of any tools other than a hammer. Furthermore, the securing elements for the swing joints are all carried by the connecter and although they may be removed from their locking positions, they need not necessarily be detached from the connecter. Their loss by misplacement, or otherwise, is thereby prevented.

As has been mentioned, coupling members are provided at each end of the intermediate S-shaped hose casting, one of which coupling members is adapted to be attached to the coupler head and a further object is to provide a means for preventing the rotation, beyond a predetermined extent, of that coupling member which is to be attached to the coupler head, so as to facilitate attachment of those two parts.

Further and important objects are to provide gasket-sealed joints of improved construction for the metallic hose structure.

With these and other objects in view, the invention comprises the novel construction, combinations and features, all as will hereinafter be more fully described and particularly pointed out in the appended claims.

In the accompanying drawings:

Figure 1 is a side elevation of a train pipe connecter embodying my invention, the end valve of the steam line of the car and one of the coupler heads being shown in dotted lines, it being understood that a similar connecter is interposed between a cooperating coupler head and the end valve of the next adjacent car.

Fig. 2 is a longitudinal sectional view of the connecter, the several sections being illustrated as lying in the same plane, although it would be understood that the lower portion of the connecter which is attached to the coupler head does not normally depend from the intermediate gasket, as shown in this view.

Fig. 3 is a transverse sectional view on the line 3—3 of Fig. 2.

Fig. 4 is a detail view, partly in section, of the lock for holding the lower end of the connecter against swinging downwardly to the position in which it is illustrated in Fig. 2.

Figs. 5, 5ª are detail views of the wedge lock for one of the swivel connections of the connecter, and Fig. 6 is a cross section showing the steam passage through the metal castings of the connecter.

In the preferred form of connecter, there is a main intermediate hose casting 10 of S-shaped formation, whose ends communicate with passages in connecting members adapted to be attached to the end valve 11 of the train pipe and to the coupler head 12, it being understood that said coupler head is connected by a similar head and connecter with the end valve of the next adjacent car train pipe. The connections between said intermediate member 10 and the train pipe consist of a nipple 13 attached to a so-called coupling sleeve 14 by a threaded sleeve 15 screwed on said coupling sleeve 14. Sleeve 15 is held against rotation by a cotter pin 16 carried by said coupling sleeve 14 and engaging against one of a series of lugs 17 on said threaded sleeve 15. As will appear, this connection permits nipple 13 and coupling sleeve 14 to swivel or rotate relatively to one another, a bronze bushing 18 being interposed between the two parts at their bearing portions. To effect a liquid and gas tight joint, a gasket 19 is interposed between the sleeve and nipple, being held against a spherical surface formed on the nipple by means of a spring element 20. The coupling sleeve 14 is, in turn, connected to the intermediate hose casting 10, the connection being such that the coupling sleeve and member 10 may swivel or rotate with respect to one another but in a plane at right angles to that in which the sleeve and nipple 13 are adapted to swivel.

In order that this connection between the coupling sleeve 14 and member 10 may be such that the parts can be detached without the aid of any tools other than a hammer, sleeve 14 is provided with an arm 21 adapted to be interposed between member 10 and a similar arm 22 formed on member 10. The two arms are provided with alined openings and threaded in the opening in arm 21 is a stud bolt or pivot pin 23, on which arm 22 from member 10 is journaled, a bronze bushing 24 being provided for wear purposes. To lock arm 22 on pin 23, a locking element, such as wedge 25, is inserted between member 10 and pivot pin 23. Preferably, wedge member 25 is provided with an offset portion 26 pivoted in arm 21 of coupling sleeve 14. With this arrangement, when wedge 25 is forced between pin 23 and member 10, arm 22 will be securely held on pivot pin 23 in that its movement longitudinally of said pin is limited to such an extent as to prevent its becoming detached. This, of course, may be done without placing the parts under such pressure as will bind the joint against movement and in the same vertical plane. At the same time, the joint between the open end of member 10 and the passage in the coupling sleeve 14 will be placed under pressure so as to insure the same being steam tight. It should be added that this joint comprises a gasket 27 held by a spring 28 against a spherical surface formed on sleeve 14, a bushing 29 also being interposed between the bearing portions of said member and sleeve. As shown in Figs. 5, 5ª, the wedge member 25 is formed with a multiplicity of openings 30, in which a cotter pin may be inserted to prevent its accidental displacement from between pin 23 and member 10.

With this arrangement, the coupling sleeve 14 and member 10 are not only securely attached to one another and a steam tight joint effectively maintained between the two, but at the same time, said parts may be quickly disconnected for repair purposes simply by removal of the cotter pin from holes 30 and the removal of wedge member 25 from between pin 23 and member 10. After this, member 10 may be moved axially of pin 23 away from arm 21, so as to give ready access to the joint between the parts. While this is being done, wedge member 25 does not have to be removed entirely, and laid aside, whereby there is a possibility of its being lost, but, on the contrary, it may remain in arm 21.

At its lower end, member 10 is provided with similar connections for attachment to the coupler head 12, except that the connection between the nipple and the coupling sleeve is such that only a limited turning movement of one part with respect to the other is permitted. In view of this, a detailed description of the connections and securing means is deemed unnecessary, it sufficing that the several parts be identified by the same reference numerals as applied to the connections at the upper end of member 10. For limiting the turning movement of nipple 13 at the lower end of the connecter, said nipple is provided with projections 31, as shown in Figs. 2 and 3, said projections being received in recessed portions 32 in the end of coupling sleeve 14. In this way, the nipple and sleeve can move with respect to one another to only a limited extent. Such an arrangement at the lower end of the connecter is preferred because the connection between nipple 13 and coupling sleeve 14 at the upper end of the connecter allows those parts to swivel throughout a complete circle, this being more than ample to compensate for all curves that a car may be called upon to take in service. It is not, therefore, necessary that the connection between the same parts at the bottom of the connecter be capable of turning throughout a complete circle. On the other hand, a limited turning movement at the lower end of the connecter is necessary to permit the coupler heads to be adjusted when the heads 12 of the two connecters are coupled together and also to permit of the rocking movement of the cars in high and low joints, where one car is twisted, so to speak. If a limited play is not allowed, a torsional twist may be imposed on the parts, so as to rupture the same. Again, by having the nipple 13, which is adapted to connect to the coupler head, limited in its turning movement, the coupler heads when detached from each other are prevented from turning upside down with respect to the sleeves 14. In other words, when two cars are uncoupled, each of them carries a connecter, such as shown, to the lower end of which there is a coupler head, said coupler heads being adapted to be coupled together only when two cars are coupled together. Therefore, when the two cars and their connecters are uncoupled, the coupling head of each connecter will be prevented from turning to any great extent, whereby they may readily be alined up with one another if and when they are to be coupled together again.

When the connecters of two cars are uncoupled, it is important that the lower coupling sleeve and nipple, together with the coupler head carried thereby, be prevented from assuming a dependent position (such as shown in Fig. 2), because, if they should be permitted to extend downwardly from the intermediate member 10, there is great likelihood of their being broken by dragging on the roadbed. For the purpose of preventing such accidents, locking means are provided that will be effective automatically or by gravity simply by swinging member 10 back beneath the car end when the two coupling heads of the connection are uncoupled. Such means preferably consist of a rod 33 pivotally suspended at its upper end from member 10, this pivotal connection being covered by a housing 34, to protect it against snow, sleet, and the like. At its lower end, member 33 is formed with bifurcations 35, and formed on sleeve 14 at the lower end of member 10 is a catch 36 so positioned with respect to the bifurcated end 35 of member 33 that by holding said sleeve 14 in a substantially horizontal position and swinging member 10 to the opposite side of its pivotal center, member 33 will move by gravity until the bifurcations 35 ride over the head 36ª of catch 36, as shown in dotted lines in Figure 1. After the parts have assumed this position, it will be impossible for the lower coupling sleeve 14 to swivel on member 10 by reason of the head 36ª of catch 36 engaging the bifurcations 35 of member 33. This form of locking means is advantageous in several respects. First, it is active, so to speak, only when the coupler heads are disconnected and when the connecter is not in use. Again, said locking means consists of elements carried by the connecter itself, not being attached to any portion of the car. At the same time, no part of the lock is attached to the coupler head so as to interfere with the coupling up of the same, as is true with some of the structures heretofore proposed.

In the foregoing description, I have referred to the several conduit members or hose sections composing the flexible metallic hose structure by terms which I consider apprapriate for commercial nomenclature, that is to say the conduit members 13 have been referred to as nipples, and the conduit members or hose sections 14 have been referred to as coupling sleeves, though the structure as a whole may be considered as a flexible metallic hose structure composed of swivel-jointed sections, the joints between the members 14 and 10 being arranged to permit relative swinging movement between these parts. It will be observed that the hose sections 14 and 10 have elbow extremities, whereby the swivel joints between these parts are at right angles to the swivel joints between the parts 14 and 13, permitting the relative swinging movements between the intermediate member 10 and the adjacent members 14.

It will be observed that the swivel joints of the illustrative hose structure are of a novel construction wherein the conduit walls of adjacent swivel-jointed hose elements have butted ends, and the joint between them is sealed by a gasket arranged wholly outside of the steam passage, one of the connected elements being formed with an annular gasket housing portion surrounding and spaced from a part of the other element which has a bevelled and preferably spherically-surfaced shoulder confronting the base of the housing which contains the gasket in peripheral engagement with the interior annular wall of the housing and bearing facewise against the said bevelled shoulder. Thus there is a substantially uniform steam passage through the connected elements, and steam passing to the gasket housing will force the gasket against the bevelled shoulder with resultant tightening of the gasket in the inner wall in which it is fitted. By the spherical surfacing of the bevelled shoulder, a ball seat is provided for the gasket, which allows the relative slight oscillations of the parts incident to jarring while insuring a steam-tight joint.

In the case of the swivel joints between the relatively swinging hose elements 10 and 14, it will be observed that both of the jointed elements have their extremities formed with annular sockets having outer and inner walls concentric with the axis of the swing joint, the gasket being fitted in the outer wall of the socket of the element 10 which outer wall is journalled in the outer wall of the socket of the element 14, while the inner walls of the two sockets have butted ends and the inner wall of the socket of the element 14 is formed with the annular bevelled shoulder on which the gasket is seated. Thus the extremity of the element 10 is journalled in and butted against the extremity of the element 14, the joint being sealed by a gasket arranged as before stated and leaving the steam passage between the connected elements entirely clear.

While my invention is primarily concerned with the provision of an improved train pipe connecter, it will be understood the features of the invention may be embodied in flexible metallic hose or piping for other purposes; also that the invention is not limited to the specific embodiment herein shown and described.

What I claim is:

1. In a swing jointed metal train-pipe connecter, end nipples adapted to be attached to a coupler head and the end valve of a railway car train pipe, an intermediate tubular member, and a coupling element connecting each nipple with said intermediate member at opposite sides of the latter, with said nipples located in substantially the same vertical plane, said intermediate member being free to revolve with respect to each coupling element and each coupling element being free to revolve with respect to its attached nipple.

2. In a swing jointed metal train-pipe connecter, end nipples adapted to be attached to a coupler head and the end valve of a railway car train pipe, an intermediate tubular member, and a coupling element connecting each nipple with said intermediate member at opposite sides of the latter with said nipples located in substantially the same vertical plane, said intermediate member being free to revolve with respect to each coupling element and each coupling element being free to revolve with respect to its attached nipple, the plane of movement of the coupling elements with respect to the nipples being at right angles to the plane of movement of the intermediate member with respect to said coupling elements.

3. In a swing jointed metal train-pipe connecter, an intermediate member, connections swiveled to one end of said member for attachment to the end valve of a railway car train pipe, connections swiveled to the other end of said member for attachment to a coupling head, and means pivoted on said member and engageable with the swiveled end of said last mentioned connections for holding the same against turning with respect to said member when the connecter being installed on one car does not have its lower end supported by coupling attachment with another connecter of an adjacent car.

4. In a swing jointed metal train-pipe connecter, an intermediate member, connections swiveled to one end of said member for attachment to the end valve of a railway car train pipe, connections swiveled to the other end of said member for attachment to a coupling head, and means pivoted on said member and engageable with said last mentioned connections upon rearward swinging movement of said member for holding the same against turning with respect to said member when the connecter being installed on one car does not have its lower end supported by coupling attachment with another connecter of an adjacent car, said holding means being disengaged from said connections when said lower end is supported by such coupling attachment.

5. In a swing jointed metal train-pipe connecter, an intermediate member, connections swiveled to one end of said member for attachment to the end valve of a railway car train pipe, connections swiveled to the other end of said member for attachment to a coupling head, and automatically actuated means pivoted on said member and engageable with said last mentioned connections by a rearward swinging movement of said member for holding the same against turning with respect to said member when the connecter being installed on one car does not have its lower end supported by coupling attachment with another connecter of an adjacent car.

6. In a swing jointed metal train-pipe connecter, an intermediate member, connections swiveled to one end of said member for attachment to the end valve of a railway car train pipe, connections swiveled to the other end of said member for attachment to a coupling head, and gravity actuated means pivoted on said member and engageable with the swiveled end of said last mentioned connections for holding the same against turning with respect to said member when the connecter being installed on one car does not have its lower end supported by coupling attachment with another connecter of an adjacent car, said holding means being disengaged from said connections when said lower end is supported by such coupling attachment.

7. In a swing jointed metal train-pipe connecter, connections adapted to be attached to the end valve of a railway car train pipe, a tubular casting swiveled at one end to said connections to swing in a vertical plane, connections swiveled to the lower end of said member and adapted to be attached to a coupler head, said casting being adapted to be swung outwardly from its pivotal center when the connecter being installed on one car does not have its lower end supported by coupling attachment with another connecter of an adjacent car, a catch on said head, and a latch pivoted on the casting movable into engagement with said catch when after uncoupling the two connecters the said casting is swung inwardly from its pivotal center.

8. In a swing jointed metal train-pipe, connecter, connections attachable to the end valve of a railway car train pipe, an arm on said connections, a casting communicating at one end with said connections, an arm on said casting pivotally attached to the arm on said connections, means pivoted in said connections for preventing movement of the casting arm longitudinally of its pivotal center, and connections at the opposite end of said casting adapted to be attached to a coupler head.

9. A swing jointed metal train-pipe connecter, comprising a casting, a connection communicating with one end of said casting, there being a steam tight joint between said parts, said casting being pivotally supported on said connection, and means pivoted in one of said parts for holding said casting against movement longitudinally of its pivotal center and for maintaining pressure on the joint between said casting and said connection.

10. A swing jointed metal train-pipe connecter, comprising a casting, a connection communicating with one end of said casting, there being a steam tight joint between said parts, an arm on said connection, a pivot pin on said arm on which said casting is pivoted adjacent its end portion, and a wedge interposed between said arm and casting for limiting movement of the casting longitudinally of its pivotal center and for holding the joint between the casting and connection under pressure.

11. A swing jointed metal train-pipe connecter, comprising a casting, a connection communicating with an end of said casting, there being a steam tight joint between said parts, an arm on said connection, a pivot pin in said arm on which an end portion of said casting is pivoted, and a wedge pivotally supported on said arm adapted to be interposed between the pivot pin and said casting for holding the joint between said casting and connection under pressure to maintain the effectiveness of said joint.

12. A swing jointed metal train-pipe connecter, comprising a casting, a connection communicating with the end of said casting, there being a steam tight joint between said parts, an arm on said connection, a pivot pin on said arm, an arm on said casting journaled on said pivot pin, and pivotally mounted releasable means for holding the casting arm on said pivot pin and maintaining pressure on the joint between said casting and connections.

13. In a swing jointed metal train-pipe connecter, a casting, connections at one end of said casting for attachment to the end valve of a railway car train pipe, a coupling element swiveled to the other end of said casting, a nipple swiveled to said coupling element, and adapted to rotate about its longitudinal center, and means integral with said nipple and coupling element for limiting the rotation of said nipple about its longitudinal center.

14. In a flexible metallic hose, swivel-jointed hose elements the conduit walls of which have butted ends, one of said elements formed with an annular gasket housing portion surrounding and spaced from a portion of the other element, said other element formed with an external beveled shoulder facing the base of said gasket housing portion, and a gasket arranged between said base and shoulder, said gasket being fitted in said housing in peripheral engagement therewith and having a cupped beveled face engaging said beveled shoulder.

15. In a flexible metallic hose, swivel-jointed hose elements the conduit walls of which have butted ends, one of said elements formed with an annular gasket housing portion surrounding and spaced from a portion of the other element, said other element formed with an external beveled shoulder facing the base of said gasket housing portion, a gasket arranged between said base and shoulder, said gasket being fitted in said housing in peripheral engagement therewith and having a cupped beveled face engaging said beveled shoulder, and spring means between the base of said housing portion and said gasket pressing it against said shoulder.

16. In a flexible metallic hose, swivel-jointed hose elements the conduit walls of which have butted ends, one of said elements formed with an annular gasket housing portion surrounding and spaced from a portion of the other element, said other element formed with an external annular shoulder having a spherical surface confronting the base of said gasket housing portion, and a gasket arranged between said base and shoulder and fitted in said housing in peripheral engagement therewith and seated on said spherical surface, the face of the gasket engaging said surface being cupped.

17. In a flexible metallic hose, swivel-jointed hose elements the conduit walls of which have butted ends, one of said elements formed with an annular gasket housing portion surrounding and spaced from a portion of the other element, said other element formed with an external annular shoulder having a spherical surface confronting the base of said gasket housing portion, a gasket arranged between said base and shoulder and fitted in said housing in peripheral engagement therewith and seated on said spherical surface, the face of the gasket engaging said surface being cupped, and spring means interposed between the gasket and base of its housing pressing the gasket against its spherical seat.

18. In a flexible metallic hose, swing-jointed hose elements having their jointed extremities formed with annular sockets having outer and inner walls concentric with the axis of the swing joint, a gasket fitted in the outer wall of the socket of one of said elements, which outer wall is journalled in the outer wall of the socket of the other element, the inner walls of the two sockets having butted ends, said other element having the inner wall of its socket formed with an annular shoulder on which the gasket is seated.

19. In a flexible metallic hose, swing-jointed hose elements having their jointed extremities formed with annular sockets having outer and inner walls concentric with the axis of the swing joint, a gasket fitted in the outer wall of the socket of one of said elements, which outer wall is journalled in the outer wall of the socket of the other element, the inner walls of the two sockets having butted ends, said other element having the inner wall of its socket formed with an external beveled shoulder, and said gasket having a cupped beveled face engaging said shoulder.

20. In a flexible metallic hose, swing-jointed hose elements having their jointed extremities formed with annular sockets having outer and inner walls concentric with the axis of the swing joint, a gasket fitted in the outer wall of the socket of one of said elements, which outer wall is journalled in the outer wall of the socket of the other element, the inner walls of the two sockets having butted ends, said other element having the inner wall of its socket formed with an external spherically surfaced shoulder on which the gasket is seated.

21. In a flexible metallic hose structure, separably connected hose elements, the connection therebetween embodying a swivel joint permitting the swinging of one of said elements relative to the other, and means carried by the respective elements cooperating to hold them connected in swivel-jointed relationship, said means including a part movably attached to one of said elements and displaceable to permit disconnection of said elements, there being no bolted or threaded fastening between said elements.

22. In a flexible metallic hose structure, separably connected hose elements, the connection therebetween embodying a swivel joint permitting the swinging of one of said elements relative to the other, and means comprising rigid parts of said elements and a movable locking part cooperating to hold the said elements connected in swivel-jointed relation, the said movable locking part being attached to one of said hose elements and being displaceable by a hammer blow to permit the disconnection of said hose elements.

23. A device according to the preceding claim in which the said movable locking part comprises a camming device adapted to be forced into a position to tighten the swivel joint connection.

24. In a flexible metallic hose structure, hose elements having elbow extremities constructed as members of and held in cooperative relation to provide a swivel joint permitting the swinging of one of said hose elements relative to the other, and means comprising cooperating rigid parts of said elements and a locking part pivoted to one of them whereby the elements are held separably connected with their swivel-joint members in cooperative relation, the said pivoted locking part being displaceable to allow disconnection of the said hose elements.

25. In a flexible metallic hose structure, hose elements having elbow extremities constructed as members of and held in cooperative relation to provide a swivel joint permitting the swinging of one element relative to the other, arms on said hose elements bearing one against the other with a separable pivotal bearing connection concentric with the said swivel joint, and a locking member carried by one of said hose elements and interposed between one of said hose elements and the arm of the other element to keep said arms in the position stated, said member being displaceable to permit disconnection of the hose elements.

26. In a flexible metallic hose structure, hose elements having elbow extremities constructed as members of and held in cooperative relation to provide a swivel joint permitting the swinging of one element relative to the other, arms on said hose elements bearing one against the other with a separable pivotal bearing connection concentric with the said swivel joint, and a locking member interposed between one of said hose elements and the arm of the other element, said locking member being pivotally connected to one of the elements and adapted to swing to and from locking position.

27. In a flexible metallic hose structure, hose elements having elbow extremities constructed as members of and held in cooperative relation to provide a swivel joint permitting the swinging of one element relative to the other, arms on said hose elements bearing one against the other with a separable pivotal bearing connection concentric with the said swivel joint, and a displaceable wedge interposed between one of said elements and the arm of the other element.

28. In a flexible metallic hose structure, swing-jointed hose elements having their jointed extremities constructed as swivel-joint members and separably clamped in cooperative relation, arms on said hose elements having a separable pivot bearing connection concentric with the joint formed by said members, and means cooperating with said arms to maintain the said joint members so clamped together, the said means comprising a part interposed between a hose element and one of said arms and displaceable therefrom to permit relative axial movement of said joint members and arms in a direction to separate the joint.

29. In a flexible metallic hose, swing-jointed hose elements having devices engageable to hold said elements in a desired angular relationship and disengageable to permit the relative swinging of the elements, said devices comprising a latch on one element movable relatively thereto and a catch on the adjacent element, the latch being automatically engageable with said catch when the elements are in a certain position.

30. A device of the class described comprising a pendent flexible metallic hose structure embodying swivel joints permitting relative rotation of the elements connected thereby and embodying other swivel jointed intermediate of those first mentioned permitting relative swinging motion of the elements connected thereby, and means arranged longitudinally of and attached to the intermediate swinging element of said device and cooperable with the lower swinging element thereof to support the latter in an up-held position when the lower end of the device is not supported by coupling to another device.

31. In a flexible metallic hose, swing-jointed hose elements having their jointed extremities formed with annular sockets having outer and inner walls concentric with the axis of the swing joint, a gasket fitted in the outer wall of the socket of one of said elements, which outer wall is journalled in the outer wall of the socket of the other element, the inner walls of the two sockets having butted ends, said other element having the inner wall of its socket formed with an annular shoulder on which the gasket is seated, and spring means acting between the rear side of the gasket and the member in which it is mounted forcing said gasket against said shoulder.

32. In a flexible metallic hose, swing-jointed hose elements having their jointed extremities formed with annular sockets having outer and inner walls concentric with the axis of the swing joint, a gasket fitted in the outer wall of the socket of one of said elements, which outer wall is journalled in the outer wall of the socket of the other element, the inner walls of the two sockets having butted ends, said other element having the inner wall of its socket formed with an external beveled shoulder, said gasket having a cupped beveled face engaging said shoulder, and spring means acting between the rear side of the gasket and the member in which it is mounted forcing said gasket against said shoulder.

33. In a flexible metallic hose, swing-jointed hose elements having their jointed extremities formed with annular sockets having outer and inner walls concentric with the axis of the swing joint, a gasket fitted in the outer wall of the socket of one of said elements, which outer wall is journalled in the outer wall of the socket of the other element, the inner walls of the two sockets having butted ends, said other element having the inner wall of its socket formed with an external spherically surfaced shoulder on which the gasket is seated, and spring means acting between the rear side of the gasket and the member in which it is mounted forcing said gasket against said shoulder.

LEONIDAS D. WOODRUFF.

CERTIFICATE OF CORRECTION.

Patent No. 1,934,960.                           November 14, 1933.

LEONIDAS D. WOODRUFF.

It is hereby certified that error appears in the printed specification of the above numbered patent requiring correction as follows: Page 4, line 60, claim 7, for "head" read lower connections; and line 65, claim 8, strike out the comma after "train-pipe"; page 6, line 19, claim 30, for "jointed" read joints; and that the said Letters Patent should be read with these corrections therein that the same may conform to the record of the case in the Patent Office.

Signed and sealed this 9th day of January, A. D. 1934.

F. M. Hopkins

Acting Commissioner of Patents.

(Seal)